US007065200B2

(12) United States Patent
Lim

(10) Patent No.: US 7,065,200 B2
(45) Date of Patent: Jun. 20, 2006

(54) METHOD OF DETECTING CIRCULAR ROUTING IN NO. 7 SIGNALING

(75) Inventor: Jung Kyun Lim, Gwangmyeong-si (KR)

(73) Assignee: LG Electronics, Inc., Seoul (KR)

(*) Notice: Subject to any disclaimer, the term of this patent is extended or adjusted under 35 U.S.C. 154(b) by 693 days.

(21) Appl. No.: 10/196,124

(22) Filed: Jul. 17, 2002

(65) Prior Publication Data

US 2003/0031308 A1 Feb. 13, 2003

(30) Foreign Application Priority Data

Jul. 19, 2001 (KR) .............................. 2001-43461

(51) Int. Cl.
*H04M 7/00* (2006.01)

(52) U.S. Cl. ................ 379/229; 379/221.01; 379/230; 379/272; 379/273

(58) Field of Classification Search ........... 379/112.08, 379/220.01, 220.02, 221.1, 229, 230, 272, 379/273, 274, 311

See application file for complete search history.

(56) References Cited

U.S. PATENT DOCUMENTS 4,284,852 A * 8/1981 Szybicki et al. ....... 379/221.01
4,991,204 A * 2/1991 Yamamoto et al. .... 379/221.01
5,142,570 A * 8/1992 Chaudhary et al. .... 379/221.07
5,544,154 A * 8/1996 Glitho ........................ 370/248
5,553,058 A * 9/1996 Glitho ........................ 370/248
5,583,848 A * 12/1996 Glitho ........................ 370/248
5,615,254 A * 3/1997 Qiu et al. ............. 379/221.01
5,638,357 A * 6/1997 Glitho et al. .............. 370/250
5,862,129 A 1/1999 Bell et al. ................... 370/236
5,889,847 A 3/1999 Copley et al. ............. 379/229
6,807,153 B1* 10/2004 Suerbaum ................... 370/248
6,816,584 B1* 11/2004 Armstrong et al. .... 379/221.02
6,816,585 B1* 11/2004 Blatt et al. ............ 379/221.03

* cited by examiner

*Primary Examiner*—Bing Q. Bui
(74) *Attorney, Agent, or Firm*—Fleshner & Kim LLP.

(57) ABSTRACT

A method of detecting circular routing in a No. 7 signaling network is provided which detects circular routing that occurs when operating the signaling network, thereby preventing congestion of links by circular routing and finding out any reasons for the link congestion. The method detects a circular routing that occurs in three or more signaling transfer points, by transmitting a message transfer part routing verification test (MRVT) message through the signal route of the highest priority among the signal routes in an available state which go to a specific destination point code (DPC), only when a link is in an unavailable state, thereby preventing congestion of links by circular routing and finding out any reasons for the link congestion.

20 Claims, 3 Drawing Sheets

METHOD OF DETECTING CIRCULAR ROUTING IN NO. 7 SIGNALING

BACKGROUND OF THE INVENTION

1. Field of the Invention

The present invention relates to a method of detecting a circular routing in No. 7 signaling network, more specifically, a method of detecting a circular routing in No. 7 signaling network to prevent a congestion of links by the circular routing and finding out any reasons of the link congestion by detecting the circular routing occurred when operating the signaling network.

2. Description of the Related Art

Differing from an existing communication path system using a communication path and a signal path together, generally, No. 7 signaling system is a common signaling system, in which a number of voice signals transmit and receive a signal information through each independent single channel by completely separating the communication path and the signal path.

A common constitution of No. 7 signaling network to which No. 7 signaling system as mentioned above is applied includes signaling points (SP) and signaling links (SL) as illustrated in FIG. 1.

In view of constitution, a signaling point of sending, receiving or transmitting a signal message generated by a user sends, receives or transmits the signal message to another signaling point, which includes a signaling end point (SEP) to send or receive the signal message at the signaling point and a pair of signaling transfer points (STP) to transmit a message from one signal link to another signal link. The signaling end point (SEP) consists of an origination point (OP) to generate the signal message and a destination point (DP) being a destination of the signal message.

As shown in FIG. 1, a No. 7 signaling network includes any of signal end points SEP1 (11) and SEP2 (12); direct locals STP1 (21) and STP2 (22) being directly connected to SEP1 (11); and remote sites STP3 (23) and STP4 (24) being connected to SEP1 (11) through locals STP1 (21) or STP2 (22). The No. 7 signaling network includes A-links 1, 2 (1, 2) directly connecting locals STP1 (21) and STP2 (22) with SEP1 (11); E-links 1, 2 (3, 4) connecting remote sites STP 3 (23) and STP4 (24) with SEP1 (11); C-links 1, 2 (5, 10) connecting local STP1 (21) with local STP2 (22) or local STP1 (23) with local STP2 (24); and B-links 1, 2, 3, 4 (6, 7, 8, 9) connecting each of local STP1 (21) and STP2 (22) to each of STP3 (23) and STP4 (24) or each of STP4 (24) and STP3 (23).

In general, the E-links 1, 2 (3, 4) are connected with the No. 7 signaling network is connected and used, while the E-links 1, 2 (3, 4) are connected. When A-link 1 (1) is in an unavailable state, the signaling network is connected to SEP1 (11) using A-link 2 (2); and when even A-link (2) is in an unavailable state, the signaling network stops.

When E-links 1, 2 (3, 4) are connected used, even though A-links 1, 2 (1, 2) are all interrupted, No. 7 signaling network can be connected to SEP1 (11), using E-links 1, 2 (3, 4).

However, if A-links 1, 2 (1, 2) and E-links 1, 2 (3, 4) at SEP1 (11) become all inactive state while No. 7 signaling network is operated by using E-links 1, 2 (3, 4), a circular routing occurs such that the message sent from SEP2 (12) to SEP1 (11) circulates among the signaling transfer points (STP).

For example, when sending a message at SEP2 (12) to SEP1 (11), if A-link 1 (1) between SEP1 (11) and local STP1 (21) becomes an inactive state, the message concentrates into A-link 2 (2), and thus A-link 2 (2) becomes the inactive state. In sequence, E-links 1, 2 (3, 4) become the inactive state due to a congestion of messages by the same reason.

When the A-links 1, 2 (1, 2) and E-links 1, 2 (3, 4) are all inactive state, the signals transmitted from SEP2 (12) continue circulating among STP1 (21), STP2 (22), STP3 (23) and STP4 (24).

As depicted above, in the event that the circular routing occurs in No. 7 signaling network, the traffic among STPs continuously increases and a congestion of links is caused. Furthermore, there may be a problem making it is impossible to find out any reasons of the link congestion.

Therefore, it is necessary to detect the circular routing in advance to prevent a congestion of links. In this connection, the circular routing occurred between two STPs is automatically detected in the system, thereby preventing the congestion of links.

Further, the circular routing occurred among three or more nodes such as among three or more STPs is detected by using a message transfer part routing verification test (MRVT) of an operation and maintenance application (OMAP) as shown in FIG. 1.

FIG. 2 is a flow chart to depict a method of detecting a circular routing in No. 7 signaling network according to the related art.

For a circular routing detection, after a command to detect the circular routing is input by an operator (S10), in FIG. 2, signal routes being capable of transmitting signals to a specific destination point code (DPC) are detected (S12).

Then, in step S12, the MRVT message is transmitted to all signal routes as detected (S14); the DPT waits until a response message to the MRVT message is received.

Upon receiving the response message to the MRVT message (S16); whether or not the received message is a MTP routing verification acknowledgement (MRVA) is checked (S18). If it is the MRVA message, the corresponding signal route is determined as a normal state(S20). However, if a MTP routing verification result (MRVR) message rather than the MRVA message is received, it is determined that a circular routing occurs in the corresponding signal route and this state is informed to the operator (S22).

At the other STP received the MRVT message transmitted at step S14 (S30), the received response message determines whether a self station is the destination point code (DPC) of the MRVT message (S32). If the station is the DPC, the MRVA message is transmitted to the other STP to transmit MRVT as the message is correctly received as the normal state(S35), and if the station is not the DPC of the MRVT message, all signal routes being capable of transmitting signals to the corresponding DPC are detected (S36).

Among the signal routes detected in step S36, there may be the routes in which the circular routing has already occurred. While the MRVT message is transmitted, all STP information is stored. Therefore, the routes with the circular routing as occurred are determined from the signal routes detected at S36, based on a history of the stored MRVT (S38), and the circular routing as occurred is informed to the other STP which transmits MRVT as the MRVR message (S40).

Through the signal routes which fail to determine the circular routing as occurred at step S38, the MRVT message is re-transmitted (S42). Then, if the response message is received (S44), and the response message is delivered to STP which transmits the MRVT message (S46).

To specify in reference to FIG. 1, when transmitting signals having SEP1 (11) as a destination point, if the A-links 1, 2 (1, 2) and E-links 1, 2 (3, 4) are all in an unavailable state, an operator checks out whether or not a circular routing occurs. Herein, when the operator input the command to detect the circular routing as occurred at STP2 (22), STP2 (22) detects the signal routes having SEP1 (11) as the DPC and being capable of transmitting the signals.

As illustrated in FIG. 1, the signal routes to transmit signals from STP2 (22) to SEP1 (11) are A-link 2 (2), C-link 1(5), B-link 2 (7) and B-link 4(9). As the A-link 2 (2) is in an unavailable state, the signals can be and B-link 4 (9).

Therefore, STP2 (22) transmits the MRVT message having SEP1 (11) as DPC to the above-mentioned C-link 1 (5), B-link 2 (7), B-link 4 (9).

To select one signal route and explain it, the MRVT message transmitted to C-link 1 (5) is delivered to STP1 (21), which checks whether or not the station is DPC of MRVT.

Since the DPC of MRVT is not STP1 (21), STP1 (21) checks the signal routes to be re-usable and to transmit the MRVT to the B-link 1(16), B-link 3 (8) and C-link 1 (5).

As MRVT has already passed through the C-link 1 (5), the history information of C-link 1 (5) is stored. Thus, the STP1 (21) determines that the circular routing is occurred in C-link 1 (5) and transmits the MRVR message to STP2 (22).

In addition, upon transmitting the MRVT message and receiving a response message, the other B-links 1, 3 (6, 8) again transmit the response message to STP2 (22).

In the same way, a related art detects the circular routing by using the MRVT message of the Operation and Maintenance Application (OMAP). In the related art, all signal routes are tested in connection with DPC of the MRVT message. Therefore, the related art has a few problems to cause any unnecessary load to the whole signaling network, to make a required time for test longer and to make it impossible to prevent a congestion of links.

Furthermore, if A-link or E-link is in an unavailable state and so the circular routing detection is performed using the MRVT message, this only increases load in No. 7 signaling network. As the circular routing detection is performed by the operator's command/instruction, there is also the problem that it is impossible to perform the circular routing detection at an appropriate time when A-link or E-link is in an unavailable state.

SUMMARY OF THE INVENTION

It is, therefore, an object of the present invention to provide a method of detecting a circular routing in No. 7 signaling network, said method of detecting the circular routing as occurred at three or more signaling transfer points (STP) by sending the MRVT message to the signal routes having the highest priority among the signal routes in an available state, which go to a specific DPC, only when A-link or E-link is in an unavailable state, thereby preventing a congestion of links by the circular routing and finding out any reasons of such congestion of links.

To achieve the above object, there is provided an invention relating to a method of detecting a circular routing in No. 7 signaling network which is connected to any of destination points and a number of signaling transfer points at a close or long distance, comprising the steps of determining an unavailable state of the link being directly connected to the destination point at any of the signaling transfer point; selecting available signal routes having the destination point as a destination, if the link directly connected to the destination point is unavailable, as a result of said determination; transmitting the MRVT message via a specific signal route among the available signal routes according to the order of priority; and detecting a corresponding signal route as a normal state or a circular routing occurrence state according to a response message, after receiving the response message from the other signaling transfer point received the MRVT message.

The process of detecting a normal state or a circular routing occurring state of the signal routes further comprises the steps of recognizing the corresponding signal route as the normal state if the response message received from the other signaling transfer point received the MRVT message is a MRVA message; and transmitting the MRVT message in regular sequence by the signal routes according to the order of priority to have the destination point as a destination point code.

According to the present invention, as the links connected to any of the destination points and the signaling transfer points in No. 7 signaling network become to be under the unavailable state in order, it is possible to initiate an operation to detect a circular routing that a message continuously circulates among a number of signaling transfer points at an appropriate time of the unavailable state, thereby detecting the circular routing, reducing the network load, finding out any reasons of a congestion of links and preventing the circular routing and the link congestion.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
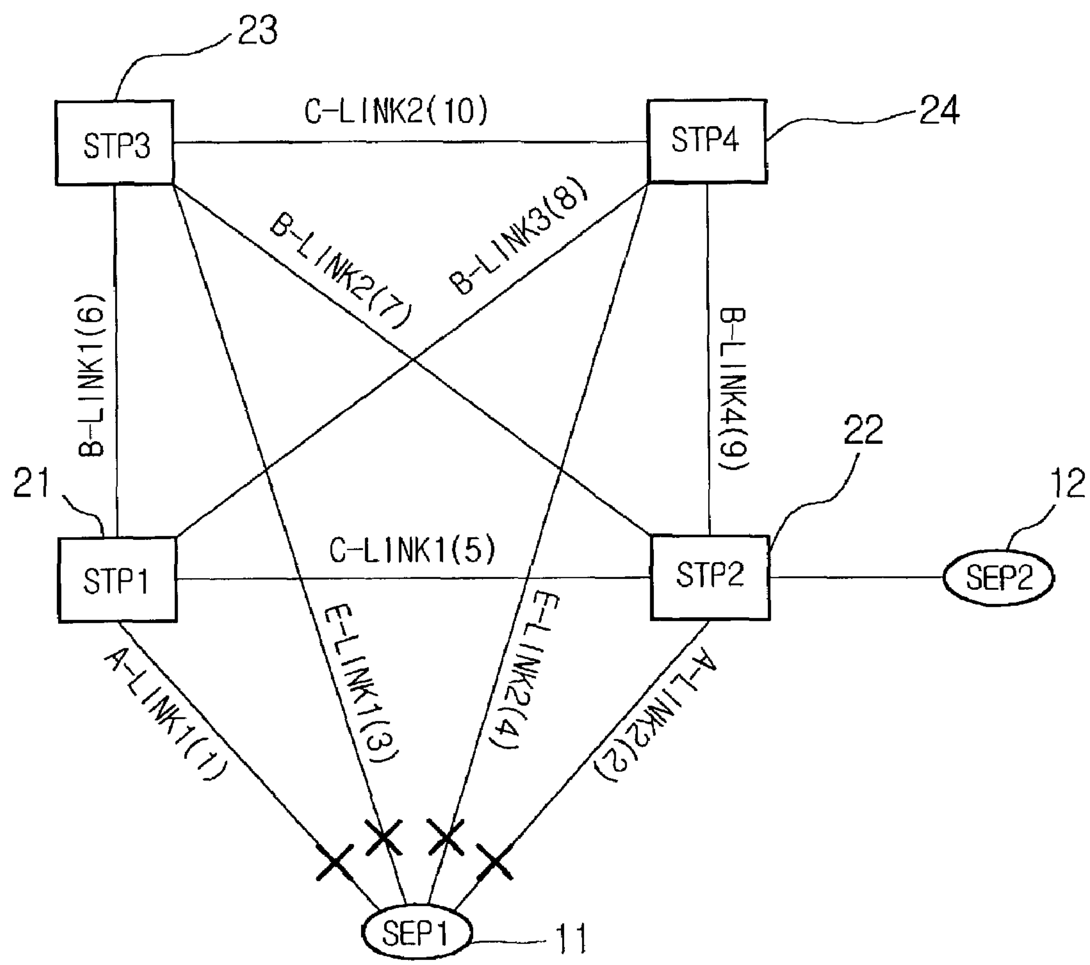
FIG. 1 is a schematic diagram illustrating No. 7 signaling network.
Figure 2:
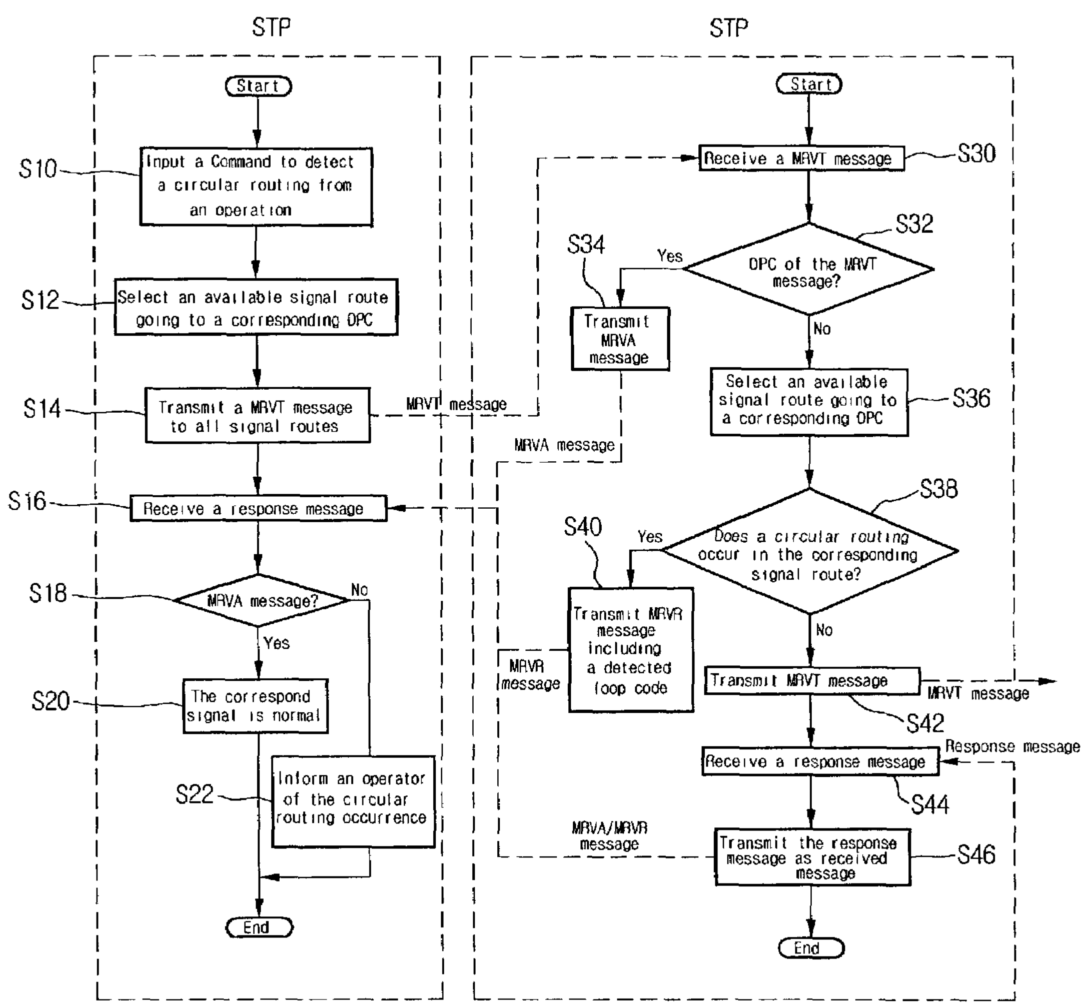
FIG. 2 is a flow chart illustrating a method of detecting a circular routing in No. 7 signaling network according to the prior art.

A preferred embodiment of the present invention will now be described with reference to the accompanying drawings. In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

A preferred embodiment according to the technical idea of the present invention relating to a method of detecting a circular routing in No. 7 signaling network is described below:

The constitution of No. 7 signaling network to which a method of detecting a circular routing according to the present invention applies is similar to that of the related art. Thus, the present invention relating to a method of detecting a circular routing is depicted in reference to FIG. 1.

Figure 3:
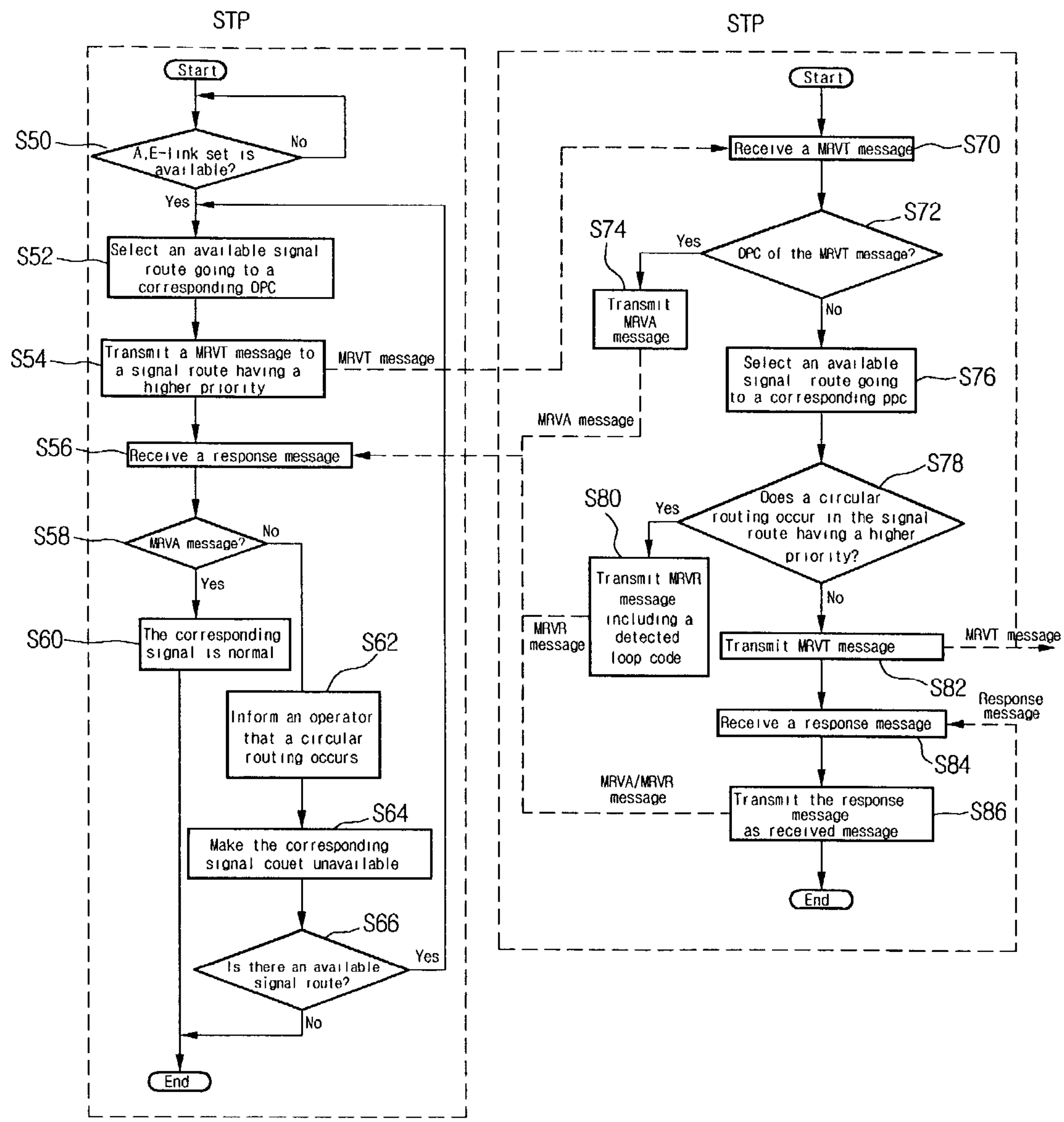
FIG. 3 is a flow chart illustrating a method of detecting a circular routing in No. 7 signaling network according to the present invention.

FIG. 3 is a flow chart to illustrate a method of detecting a circular routing in No. 7 signaling network according to the present invention.

By checking a link state with any of destination points (SEP) connected to a self station by an A-link or E-link at any of signaling transfer points (STP), it is determined whether A-link or E-link connected to the SEP is in an unavailable state (S50).

As a result of determination at step S50, in the event that the A-link or E-link is in an unavailable state, available signal routes which have the destination points (SEP) connected through the A-link or E-link before changing to the unavailable state as the destination point code (DPC) are detected (S52); the MRVT message is transmitted through the signal route having the highest priority among the detected signal routes (S54); and it waits until a response message is received from the corresponding STP.

While waiting to receive the response message to the MRVT message, upon receiving the message from the corresponding STP (S56), it is determined if the response message is the MRVA message (S58).

As a result of determination at step S58, if the response message as received is the MRVA message, the corresponding signal route is determined as normal state (S60); and if the response message is the MRVR message including a detected loop code, which indicates that a circular routing occurs, it is informed to an operator that the circular routing has occurred (S62) and the corresponding signal route is changed to an unavailable state (S64).

Whether any other available signal route forwarding to a specific DPC is detected (S66) and if any available signal route is detected, the process from step S52 is repeated.

Meanwhile, the other STP to receive the MRVT message transmitted at step S54 receives the MRVT message (S70) and determines whether the station is DPC of the MRVT message (S72).

As a result of determination at step S72, if the station is DPC of the MRVT message, the MRVA message to indicate the corresponding signal route is normal is transmitted to STP transmitted the MRVT message (S74); if the station is not DPC, whether any available signal routes going to the corresponding DPC exist is detected (S76) and whether or not any circular routing occurs is checked from the signal route having the highest priority (S78).

At step S78, whether a circular routing occurs in corresponding signal routes is determined on the basis of the history of a corresponding MRVT message (i.e., information of STP through which the MRVT message passes) included in the MRVT message as received.

That is, if the signal route to transmit the MRVT message is recorded in the history, it is determined that a circular routing occurs in a corresponding signal route; if the signal route to transmit the MRVT message is not recorded in the history, it is determined that any circular routing does not occur in the corresponding signal route.

As a result of determination at step S78, if a circular routing occurs in the corresponding signal route, in order to inform that the circular routing occurs in STP transmitting the MRVT message at step S54, the MRVR message including a detected loop code is transmitted (S80), and if any circular routing does not occur in the corresponding signal route, the MRVT message is transmitted to the corresponding signal route (S82).

Then, waiting a response message to the MRVT message from the STP receiving the MRVT message as transmitted at step S82 and upon receiving the response message (S84), the response message as received is transmitted to the STP transmitting the MRVT message at step S54 (S86).

The operation of the circular routing detecting method according to the above-mentioned process is described in reference to FIG. 1 as follows:

The circular routing detecting operation in STP2 (22) connected with SEP 1(11) and the A-link 2 (2) is taken as an example. The STP2 (22) periodically observes the state of the A-link 2 (2) connected to the SEP1 (11) and determines whether or not an unavailable state, and if A-link 2 (2) is in the unavailable state, the circular routing detection operation begins.

First, signal routes to transmit a message to the SEP1 (11) is detected (S52). In order to transmit the message to SEP1 (11) at STP2 (22) in addition to A-link 2 (2) which has been already in the unavailable state in FIG. 1, detected are all of a signal route to transmitting the message to C-link 1 (5)-A-link 1 (1) through STP1 (21), a signal route of B-link 2 (7)-E-link 1 (3) to transmit signals through STP3 (23), and a signal route to send a message through other STP1, STP3, STP4 (21, 23, 24).

The signal route which has the highest priority among the detected signal routes is selected, in which a signal route having a higher priority is determined by applying the priority table of signal routes as Table 1.

TABLE 1

| Priority | STP1 | STP2 | STP3 | STP4 |
|---|---|---|---|---|
| 0 | A-link 1 (1) | A-link 2 (2) | E-link 1 (3) | E-link 2 (4) |
| | B-link 1 (6) | B-link 2 (7) | B-link 1 (6) | B-link 3 (8) |
| 1 | B-link 3 (8) | B-link 4 (9) | B-link 2 (7) | B-link 4 (9) |
| 2 | C-link 1 (5) | C-link 1 (5) | C-link 2 (10) | C-link 2 (10) |

In case of C-link 1, 2 (5, 10), as a probability of circular routing occurrence is high regardless the link inactivity order, C-link 1, 2 (5, 10) is mostly placed on the lowest priority.

Based on the above priority table, the signal route of B-link 2 (7) STP2 (22) is determined as having the highest priority according to the unavailable state of A-link 2 (2) at STP2 (22) and transmits the MRVT message (S54).

The MRVT message is transmitted to STP3 (23) through B-link 2 (7) and whether the station is DPC of the MRVT message received at STP3 (23) is checked (S72). Herein, since the station is not DPC, a signal route to transmit the message to SEP 1 (11) as the DPC is detected (S76).

The signal route having the highest priority among the detected signal routes is E-link 1 (3) according to the priority table as shown in Table 1, in which if E-link 1 (3) is in an available state, a check based on the MRVT message history is processed (S78), and as the result, since there is no circular routing, the MRVT message is transmitted to SEP 1 (11) through E-link 1 (3) (S82).

As the station is the DPC of the MRVT message at SEP1(11) receiving MRVT, the MRVA message thereof is transmitted to STP3 (23) and the same is again transmitted to STP2 (22) at STP3 (23) receiving the MRVA message, thereby informing that any circular routing does not occur in the corresponding signal route.

As to other signal routes having the following priority order, STP2 (22) checks whether or not any circular routing occurs according to the above-mentioned process.

When receiving the MRVT message at STP3 (23) and detecting the signal routes, if E-link 1 (3) is in the unavailable state, the MRVT message is transmitted through B-link 1 (6) which is placed on a next priority at STP1 (21). As the station is not DPC of the MRVT message at STP1 (21), the MRVT message is to be transmitted to A-link 1 (1) according to the order of priority, in which a probability that A-link 1 (1) will be under the unavailable state is high. It is because the message flows into A-link 1 (1) and E-links 1, 2 (3, 4) as A-link 2 (2) is changed to the unavailable state, and therefore a situation of changing into the unavailable state is apt to occur in turn.

Accordingly, STP1 (21) transmits the MRVT message to B-link 3 (8) according to the order of priority and delivers the message to STP4 (24), in which the MRVT message according to the order of priority is again delivered to STP2 (22).

At this time, at STP2 (22), it is possible to know whether the circular routing occurs by using the history of the MRVT message, thereby preventing any further circular routing operation by making the signal routing be under the unavailable state.

According to a method of detecting a circular routing in No. 7 signal network in the present application as described above, in the event that the link among STPs directly connected to any of SEPs at a close or long distance is under the unavailable state, the MRVT message is sent to only the signal rout having the higher priority among the available signal routes forwarding to SEP, thereby detecting any circular routing occurred at three or more STP and providing effects to prevent a congestion of links by the circular routing and to find out any reasons of the congestion of links.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for detecting a circular routing in a No. 7 signaling network which is connected to any of a number of destination points and a number of signaling transfer points at a close or long distance, comprising:

determining an unavailable state of a link directly connected to a destination point at any of the signaling transfer points;

selecting available signal routes having the destination point as a destination, if the link directly connected to the destination point is unavailable, as a result of said determination;

transmitting a message transfer part routing verification test (MRVT) message via a specific signal route among the available signal routes according to an order of priority; and detecting a corresponding signal route as in a normal state or in a circular routing state according to a response message, after receiving the response message from the signaling transfer point that received the MRVT message.

2. The method of claim 1, wherein the detecting step comprises:

recognizing the corresponding signal route as in the normal state if the response message received from the signaling transfer point that received the MRVT message is a message transfer part routing verification acknowledgment (MRVA) message; and transmitting the MRVT message in regular sequence by the signal routes according to the order of priority that have the destination point as a destination point code.

3. The method of claim 1, wherein the detecting step comprises:

informing an operator of the circular routing state in the corresponding signal route and changing the signal route to the unavailable state, if the response message received from the signaling transfer point that received the MRVT message is a message transfer part routing verification result (MRVR) message; and transmitting the MRVT message in regular sequence by the signal routes according to the order of priority that have the destination point as a destination point code.

4. The method of claim 1, wherein any of the signaling transfer points repeatedly transmits the MRVT message to one signal route based on the order of priority and receives the response message regarding the state of the signal route from the signaling transfer point that received the MRVT message.

5. The method of claim 1, wherein a priority of the signal routes is determined based on a priority table as optionally established by an operator.

6. The method of claim 1, wherein a priority of the signal routes determines the order of priority to transmit the MRVT message according to the extent of a distance to the destination point.

7. The method of claim 1, wherein the signaling transfer point that receives the MRVT message determines if the signaling transfer point is the destination point code of the MRVT message; and transmits the MRVA message as a response message if the signaling transfer point is the destination point code of the MRVT message.

8. The method of claim 1, wherein the signaling transfer point that receives the MRVT message determines if the signaling transfer point is the destination point code of the MRVT message; detects an available signal route being a corresponding destination point code if the signaling transfer point is not the destination point code of the MRVT message; determines if any circular routing occurs with reference to history information of the MRVT message according to the order of priority of the available signal routes; and transmits a MRVR message as a response message if the circular routing occurs.

9. The method of claim 8, further comprising transmitting the MRVT message to a signal route having a higher priority among the signal routes not in the circular routing state, and receiving a response message and transmitting the same to the signaling transfer point transmitting the MRVT message.

10. The method of claim 8, wherein whether or not the signal route is in the circular routing state is determined by using the history information of the passing signaling transfer point in the MRVT message as received.

11. The method of claim 1, wherein the circular routing detecting step at all signaling transfer points directly connected to the destination point at a close or long distance is carried out by checking the state of the link with each destination point.

12. A method for detecting circular routing in a No. 7 signaling network, comprising:

determining an unavailable state of a link direcdy connected to a destination point;

selecting available signal routes having the destination point as a destination;

transmitting a test message via one of the available signal routes determined according to an order of priority; and detecting whether the signal route is in a normal state or in a circular routing state according to whether a response message is a first type response message or a second type response message.

13. The method of claim 12, wherein detecting whether the signal route is in a normal state or in a circular routing state according to whether a response message is a first type response message or a second type response message comprises:

recognizing that the signal route is in the normal state if the response message is the first type response message; and transmitting the test message in regnlar sequence by the signal routes according to the order of priority.

14. The method of claim 12, wherein detecting whether the signal route is in a normal state or in a circular routing state according to whether a response message is a first type response message or a second type response message comprises:

if the signal message is in a circular routing state informing an operator and changing the signal route to the unavailable state; and transmitting the test message in regular sequence by the signal routes according to the order of priority.

15. The method of claim 12, wherein the order of priority of the available signal routes is determined based on a priority table established by an operator.

16. The method of claim 12, wherein the order of priority of the available signal routes is based on a distance to the destination point.

17. The method of claim 12, wherein a signaling transfer point that receives the test message determines if the signaling transfer point is the destination point code of the test message, and transmits the response message if the signaling transfer point is the destination point code of the test message.

18. The method of claim 12, wherein the signaling transfer point that receives the test message determines if the signaling transfer point is the destination point code of the test message, detects an available signal route of a corresponding destination point code if the signaling transfer point is not the destination point code of the test message, determines if any circular routing occurs with reference to history information of the test message according to the order of priority of the available signal routes, and transmits the second type response message if circular routing occurs.

19. The method of claim 18, further comprising transmitting the test message to a signal route having a higher priority among the available signal routes not in the circular routing state, and receiving a response message and transmitting the same to a signaling transfer point transmitting the test message.

20. The method of claim 12, wherein the detecting step is carrier out at all signaling transfer points directly connected to the destination point by checking a state of each link with the destination point.

* * * * *